(12) United States Patent
Amano et al.

(10) Patent No.: US 9,850,802 B2
(45) Date of Patent: Dec. 26, 2017

(54) COOLANT CONTROL DEVICE

(71) Applicants: Takashi Amano, Susono (JP); Kojiro Hayakawa, Sunto-gun (JP)

(72) Inventors: Takashi Amano, Susono (JP); Kojiro Hayakawa, Sunto-gun (JP)

(73) Assignees: TOYOTA JIDOSHA KABUSHIKI KAISHA, Toyota-shi (JP); AISIN SEIKI KABUSHIKI KAISHA, Kariya-shi (JP)

( * ) Notice: Subject to any disclaimer, the term of this patent is extended or adjusted under 35 U.S.C. 154(b) by 190 days.

(21) Appl. No.: 14/420,976

(22) PCT Filed: Aug. 9, 2013

(86) PCT No.: PCT/IB2013/001743
§ 371 (c)(1),
(2) Date: Feb. 11, 2015

(87) PCT Pub. No.: WO2014/027238
PCT Pub. Date: Feb. 20, 2014

(65) Prior Publication Data
US 2015/0240701 A1 Aug. 27, 2015

(30) Foreign Application Priority Data
Aug. 13, 2012 (JP) ................ 2012-179317

(51) Int. Cl.
*F01P 9/00* (2006.01)
*B60H 1/00* (2006.01)
(Continued)

(52) U.S. Cl.
CPC ............ *F01P 7/16* (2013.01); *B60H 1/00314* (2013.01); *F01P 7/14* (2013.01); *F01P 7/164* (2013.01);
(Continued)

(58) Field of Classification Search
CPC ...... F01P 11/06; F01P 7/14; F01P 7/16; F01P 3/20; F01P 11/18; F01P 7/164; F01P 2007/146; F01P 2025/30; B60H 1/00314
(Continued)

(56) References Cited

U.S. PATENT DOCUMENTS

| | | | | |
|---|---|---|---|---|
| 2009/0217645 A1* | 9/2009 | Sisken | ................ | F01N 3/035 60/286 |
| 2009/0229543 A1* | 9/2009 | Suzuki | .................. | F01N 5/02 123/41.02 |
| 2012/0160447 A1* | 6/2012 | Kinomura | ............. | B60H 1/025 165/51 |

FOREIGN PATENT DOCUMENTS

| | | |
|---|---|---|
| JP | 2009-150266 A | 7/2009 |
| JP | 2010-007570 A | 1/2010 |
| JP | 2011-099400 A | 5/2011 |

* cited by examiner

*Primary Examiner* — Syed O Hasan
(74) *Attorney, Agent, or Firm* — Andrews Kurth Kenyon LLP

(57) ABSTRACT

A coolant control device includes: first control means for, at warm-up of an internal combustion engine, circulating coolant in a first passage bypassing the engine and stopping coolant circulation in the second passage passing through the engine; second control means for, at engine warm-up and when the quantity of heat required by a heater core is smaller than or equal to a predetermined threshold, circulating coolant in the first passage while adjusting the flow rate of coolant circulating in the first passage and stopping coolant circulation in the second passage; and third control means for, at engine warm-up and when the required quantity of heat exceeds the predetermined threshold, circulating coolant in the first passage without decreasing the flow rate of coolant circulating in the first passage and circulating cool-
(Continued)

ant in the second passage while adjusting the flow rate of coolant circulating in the second passage.

5 Claims, 5 Drawing Sheets

(51) Int. Cl.
    *F01P 7/16*          (2006.01)
    *F01P 7/14*          (2006.01)
    *F01P 11/18*        (2006.01)
    *F01P 3/20*          (2006.01)

(52) U.S. Cl.
    CPC ................ *F01P 3/20* (2013.01); *F01P 11/18* (2013.01); *F01P 2007/146* (2013.01); *F01P 2025/30* (2013.01); *F01P 2037/02* (2013.01); *F01P 2060/08* (2013.01)

(58) Field of Classification Search
    USPC .............................. 123/41.02, 552; 701/102
    See application file for complete search history.

COOLANT CONTROL DEVICE

CROSS-REFERENCE TO RELATED APPLICATIONS

This is a national phase application based on the PCT International Patent Application No. PCT/IB2013/001743 filed Aug. 9, 2013, claiming priority to Japanese Patent Application No. 2012-179317 filed Aug. 13, 2012, the entire contents of both of which are incorporated herein by reference.

BACKGROUND OF THE INVENTION

1. Field of the Invention

The invention relates to a coolant control device for controlling a cooling device that cools or warms up an internal combustion engine by circulating coolant.

2. Description of Related Art

In an existing art, there has been suggested a technique for circulating coolant in order to cool or warm up an internal combustion engine (engine). For example, Japanese Patent Application Publication No. 2009-150266 (JP 2009-150266 A) describes a technique for adjusting the ratio between the flow rate of coolant in a water jacket of an internal combustion engine and the flow rate of coolant in a bypass passage that bypasses the internal combustion engine when the internal combustion engine is warmed up. More specifically, JP 2009-150266 A describes a technique for circulating coolant in the bypass passage while stopping circulation of coolant in the water jacket at the time of warm-up of the internal combustion engine in order to facilitate the warm-up of the internal combustion engine. In addition, JP 2009-150266 A describes a technique for, in order to suffice the quantity of heat required by a heater core, at the time of warm-up of the internal combustion engine and when the quantity of heat required by the heater core is larger than the quantity of heat recovered by an exhaust heat recovery device, (i) stopping circulation of coolant in the bypass passage and circulating coolant in the water jacket or (ii) reducing the flow rate of coolant that circulates in the bypass passage and increasing the flow rate of coolant that circulates in the water jacket.

Another related art relating to the invention of the present application may be Japanese Patent Application Publication No. 2011-99400 (JP 2011-99400 A). JP 2011-99400 A describes a technique for, when there is no request to heat the inside of a vehicle cabin, circulating coolant in a coolant passage that bypasses an internal combustion engine while stopping circulation of coolant in a coolant passage that passes through the internal combustion engine by closing a relief valve. In addition, JP 2011-99400 A describes a technique for, in order to suffice a heating request, when there is a request to heat the inside of the vehicle cabin, circulating coolant in the coolant passage that passes through the internal combustion engine in addition to circulating coolant in the coolant passage that bypasses the internal combustion engine by opening the relief valve.

On the other hand, with the technique described in JP 2009-150266 A, when the quantity of heat required by the heater core is larger than the quantity of heat recovered by the exhaust heat recovery device, the flow rate of coolant in the bypass passage that passes through the exhaust heat recovery device is set to zero or reduced and then coolant flows into the water jacket of the internal combustion engine. Therefore, the flow rate of coolant flowing into the water jacket relatively easily increases, so the quantity of heat generated by the internal combustion engine is relatively easily drawn by coolant. Therefore, with the technique described in JP 2009-150266 A, there is a concern that the startability of the internal combustion engine deteriorates. Such deterioration in the startability of the internal combustion engine leads to deterioration in fuel economy.

Similarly, with the technique described in JP 2011-99400 A, when there is a heating request, the flow rate of coolant in the coolant passage that passes through the internal combustion engine significantly increases due to the opened relief valve. Therefore, the quantity of heat generated by the internal combustion engine is relatively easily drawn by coolant, so there is a concern that the startability of the internal combustion engine deteriorates. Such deterioration in the startability of the internal combustion engine leads to deterioration in fuel economy.

SUMMARY OF THE INVENTION

The invention provides a coolant control device that is able to supply coolant while appropriately suppressing deterioration in fuel economy.

An aspect of the invention provides a coolant control device that controls a cooling device including a first passage for circulating coolant between an exhaust heat recovery device and a heater core while bypassing an internal combustion engine and a second passage for circulating the coolant between the internal combustion engine and the heater core. The coolant control device includes: first control means for, during warm-up of the internal combustion engine, (i) circulating the coolant to the first passage and (ii) stopping circulation of the coolant in the second passage; second control means for, during warm-up of the internal combustion engine and when a required quantity of heat required by the heater core is smaller than or equal to a predetermined threshold, (i) adjusting a flow rate of the coolant that circulates in the first passage on the basis of the required quantity of heat and then circulating the coolant in the first passage and (ii) stopping circulation of the coolant in the second passage; and third control means for, during warm-up of the internal combustion engine and when the required quantity of heat exceeds the predetermined threshold, (i) circulating the coolant in the first passage without reducing the flow rate of the coolant that passes through the first passage as compared to the flow rate of the coolant that circulates in the first passage when the required quantity of heat is smaller than or equal to the predetermined threshold and (ii) adjusting a flow rate of the coolant that circulates in the second passage on the basis of the required quantity of heat and then circulating the coolant in the second passage.

With the coolant control device according to the aspect of the invention, it is possible to control the cooling device that cools the internal combustion engine by circulating coolant.

The cooling device includes the first passage and the second passage.

The first passage is a coolant passage for circulating coolant between the exhaust heat recovery device and the heater core. Particularly, the first passage functions as a bypass passage that bypasses the internal combustion engine (that is, a bypass passage that does not pass through the internal combustion engine). The exhaust heat recovery device may be a device that facilitates an exchange of heat between exhaust heat emitted from the internal combustion engine (for example, heat arising from exhaust gas) and coolant that passes through the inside of the exhaust heat recovery device. The exhaust heat recovery device transfers the exhaust heat, emitted from the internal combustion engine, to the coolant that passes through the inside of the exhaust heat recovery device. The heater core is a device that facilitates an exchange of heat between the coolant that passes through the inside of the heater core and the heater core. The heater core recovers heat of the coolant that passage through the inside of the heater core. Heat recovered by the heater core may be, for example, used for heating, defrosting, deicing, or the like.

The second passage is a coolant passage for circulating coolant between the internal combustion engine and the heater core.

Over the thus configured cooling device, the first control means of the coolant control device controls a mode of circulation of coolant mainly during warm-up of the internal combustion engine (that is, while the internal combustion engine in a cold state is being warmed up) (more specifically, in at least a part of a period during which the warm-up is performed). Specifically, the first control means controls the cooling device (more specifically, for example, a flow regulating valve, an electric water pump, and the like, included in the cooling device) such that coolant circulates in the first passage and circulation of coolant in the second passage is stopped. As a result of control of the first control means, coolant circulates in the first passage, and coolant stagnates in the second passage.

The second control means controls a mode of circulation of coolant mainly during warm-up of the internal combustion engine and when the required quantity of heat required by the heater core is smaller than or equal to the predetermined threshold. Specifically, the second control means, as well as the first control means, controls the cooling device such that coolant circulates in the first passage and circulation of coolant in the second passage is stopped. However, different from the first control means, the second control means adjusts the flow rate of coolant that circulates in the first passage on the basis of the required quantity of heat required by the heater core. Typically, the second control means adjusts the flow rate of coolant that circulates in the first passage (that is, the flow rate of coolant that flows into the heater core via the exhaust heat recovery device) to such an extent that the required quantity of heat required by the heater core can be sufficed.

The "predetermined threshold" is desirably set to any value by which it is possible to appropriately determine whether the required quantity of heat required by the heater core can be sufficed by heat recoverable by the heater core. Such a predetermined threshold may be, for example, a maximum value of the quantity of heat recoverable by the heater core. For example, the quantity of heat recoverable by the heater core is determined on the basis of the flow rate of coolant that passes through the heater core (that is, the flow rate of coolant that circulates in the first passage) and the temperature of coolant at the time when the coolant passes through the heater core. Therefore, the maximum value of the quantity of heat recoverable by the heater core may be set on the basis of the maximum value of the flow rate of coolant that passes through the heater core and the temperature of coolant at the time when the coolant passes through the heater core.

The third control means controls a mode of circulation of coolant mainly during warm-up of the internal combustion engine and when the required quantity of heat required by the heater core exceeds the predetermined threshold. Specifically, different from the first and second control means, the third control means controls the cooling device such that not only coolant circulates in the first passage but also coolant circulates in the second passage. At this time, the third control means does not reduce the flow rate of coolant that circulates in the first passage (typically, the third control means keeps the flow rate) as compared to the flow rate of coolant that circulates in the first passage when the required quantity of heat required by the heater core is smaller than or equal to the predetermined threshold. Particularly, the third control means desirably does not reduce the flow rate of coolant that circulates in the first passage as compared to the maximum value of the flow rate of coolant that circulates in the first passage when the required quantity of heat required by the heater core is smaller than or equal to the predetermined threshold (that is, the third control means keeps the flow rate of coolant that circulates in the first passage at the maximum value). In addition, the third control means adjusts the flow rate of coolant that circulates in the second passage on the basis of the required quantity of heat required by the heater core. The third control means adjusts the flow rate of coolant that circulates in the second passage (that is, the flow rate of coolant that flows into the heater core via the internal combustion engine) to such an extent that the required quantity of heat required by the heater core (particularly, the quantity of heat that is not provided by heat of coolant that circulates in the first passage within the required quantity of heat) can be sufficed.

With the above coolant control device, the following technical advantageous effects are obtained.

First, through the operation of the first control means, during warm-up of the internal combustion engine, coolant circulates in the first passage, and coolant stagnates in the second passage. Thus, in comparison with a mode in which coolant circulates in the second passage, heating of coolant that stagnates in the second passage passing through the internal combustion engine is facilitated (in other words, cooling of coolant is suppressed). As a result, warm-up of the internal combustion engine is facilitated. Thus, deterioration of fuel economy is appropriately suppressed.

In addition, through the operation of the second control means, during warm-up of the internal combustion engine and when the required quantity of heat of the heater core is smaller than or equal to the predetermined threshold (that is, the required quantity of heat is relatively small) as well, coolant circulates in the first passage, and coolant stagnates in the second passage. Therefore, warm-up of the internal combustion engine is facilitated. Thus, deterioration of fuel economy is appropriately suppressed.

In addition, through the operation of the second control means, the required quantity of heat of the heater core is sufficed by adjusting the flow rate of coolant that circulates in the first passage. Therefore, there is almost or completely no influence on the operation for utilizing heat recovered by the heater core (for example, heating, defrosting, deicing, or the like).

In addition, through the operation of the third control means, during warm-up of the internal combustion engine and when the required quantity of heat of the heater core exceeds the predetermined threshold (that is, when the required quantity of heat is relatively large), coolant circulates in both the first and second passages. Thus, even when the required quantity of heat required by the heater core is not sufficed by only adjustment of the flow rate of coolant that circulates in the first passage, the required quantity of heat required by the heater core is appropriately sufficed by both the quantity of heat of coolant that circulates in the first passage and the quantity of heat of coolant that circulates in the second passage.

In addition, through the operation of the third control means, even when coolant circulates in the second passage in order to suffice the required quantity of heat required by the heater core, the flow rate of coolant that circulates in the first passage is not reduced (typically, the flow rate of coolant that circulates in the first passage is kept at the maximum value). Therefore, in comparison with the comparative coolant control device in which the flow rate of coolant that circulates in the first passage reduces, it is possible to minimize an increase in the flow rate of coolant that circulates in the second passage. Thus, according to the aspect of the invention, the flow rate of coolant that passes through the internal combustion engine is relatively hard to increase in comparison with the comparative coolant control device. Therefore, according to the aspect of the invention, the quantity of heat generated by the internal combustion engine is relatively hard to be drawn by coolant in comparison with the comparative coolant control device. Therefore, according to the aspect of the invention, warm-up of the internal combustion engine is easily facilitated in comparison with the comparative coolant control device. Thus, deterioration of fuel economy is appropriately suppressed.

In the technique described in JP 2009-150266 A, when the required quantity of heat required by the heater core is larger than the quantity of heat recovered by the exhaust heat recovery device, the flow rate of coolant in the bypass passage that passes through the exhaust heat recovery device is set to zero or reduced, and then coolant flows into the water jacket of the internal combustion engine. More specifically, in the technique described in JP 2009-150266 A, a total of the flow rate of coolant that circulates in the bypass passage and the flow rate of coolant that circulates in the water jacket is kept constant, and then coolant flows into the water jacket. That is, the technique described in JP 2009-150266 A corresponds to the comparative coolant control device in which the flow rate of coolant that circulates in the first passage reduces. Thus, the technique described in JP 2009-150266 A apparently differs from the coolant control device according to the aspect of the invention. Furthermore, with the technique described in JP 2009-150266 A, various advantageous effects (particularly, the advantageous effect that is achieved through the operation of the third control means) that are obtained from the coolant control device according to the aspect of the invention are not obtained.

In addition, with the technique described in JP 2011-99400 A, when there is a heating request, the flow rate of coolant in the passage that passes through the internal combustion engine significantly increases due to the opened relief valve. This is because the relief valve opens on a pressure difference between a pressure on the upstream side of the relief valve (that is, the pressure of coolant in the coolant passage that passes through the internal combustion engine) and a pressure on the downstream side of the relief valve (that is, the pressure of coolant in the coolant passage that bypasses the internal combustion engine). That is, with the technique describes in JP 2011-99400 A, it is not possible to minimize an increase in the flow rate of coolant that circulates in the coolant passage passing through the internal combustion engine. Thus, with the technique described in JP 2011-99400 A, it is not possible to suppress deterioration of fuel economy (particularly, deterioration of fuel economy due to coolant that circulates so as to pass through the internal combustion engine) in comparison with the coolant control device according to the aspect of the invention. Furthermore, with the technique described in JP 2011-99400 A, it is required to significantly increase the flow rate of coolant in the coolant passage that passes through the internal combustion engine in order to open the relief valve, so it is required to drive the electric pump for supplying coolant at a relatively high load. Thus, with the technique described in JP 2011-99400 A, the amount of electric power consumed by the electric pump significantly increases as compared to the coolant control device according to the aspect of the invention. As a result, with the technique described in JP 2011-99400 A, it is not possible to suppress deterioration of fuel economy (particularly, deterioration of fuel economy due to driving of the electric pump). Thus, the technique described in JP 2011-994002 A apparently differs from the coolant control device according to the aspect of the invention. Furthermore, with the technique described in JP 2011-99400 A, it is not possible to obtain various advantageous effects (particularly, the advantageous effect achieved through the operation of the third control means) that are obtained from the coolant control device according to the aspect of the invention.

The coolant control device according to the aspect of the invention may not include the second control means. In this case, during warm-up of the internal combustion engine and the quantity of heat is required by the heater core, the third control means may (i) circulate coolant in the first passage without reducing the flow rate of coolant that circulates in the first passage as compared to the flow rate of coolant that circulates in the first passage when the quantity of heat is not required by the heater core and (ii) circulate coolant in the second passage while adjusting the flow rate of coolant that circulates in the second passage on the basis of the quantity of heat required by the heater core.

Alternatively, in the case where the coolant control device does not include the second control means, during warm-up of the internal combustion engine and when the quantity of heat is required by the heater core, the third control means may circulate coolant in at least one of the first passage and the second passage while adjusting the flow rate of coolant that circulates in the first passage and the flow rate of coolant that circulates in the second passages (for example, while increasing, reducing or setting to zero the flow rate of coolant that circulates in the first passage and the flow rate of coolant that circulates in the second passages) such that deterioration of fuel economy due to adjustment of the flow rate of coolant that circulates in the first passage and adjustment of the flow rate of coolant that circulates in the second passage is reduced. When coolant is circulated in the second passage in order to suffice the required quantity of heat required by the heater core, warm-up of the internal combustion engine is hindered by coolant that circulates in the second passage, so there is a concern that fuel economy deteriorates. Therefore, when the required quantity of heat required by the heater core is sufficed by adjusting the flow rate of coolant that circulates in the first passage instead of circulating coolant in the second passage, it is possible to suppress deterioration of fuel economy due to coolant that passes through the internal combustion engine. However, in order to adjust the flow rate of coolant that circulates in the first passage, it may be required to drive the electric pump, which supplies coolant to the first passage, at a high load. Therefore, when the flow rate of coolant that circulates in the first passage is adjusted, there is a concern that fuel economy deteriorates due to the amount of electric power consumed as the electric pump is driven. Thus, the third control means desirably adjusts the flow rate of coolant that circulates in the first passage and the flow rate of coolant that circulates in the second passage such that deterioration of fuel economy as a whole in consideration of both deterioration of fuel economy due to adjustment of the flow rate of coolant that circulates in the first passage (for example, deterioration of fuel economy due to driving of the electric pump) and deterioration of fuel economy due to adjustment of the flow rate of coolant that circulates in the second passage (for example, deterioration of fuel economy due to coolant that circulates so as to pass through the internal combustion engine) is reduced as much as possible (or minimized).

In the coolant control device according to another aspect of the invention, the second control means may increase the flow rate of the coolant that circulates in the first passage on the basis of the required quantity of heat as compared to the flow rate of the coolant that circulates in the first passage when the required quantity of heat is zero.

According to this aspect, during warm-up of the internal combustion engine and when the required quantity of heat required by the heater core is smaller than or equal to the predetermined threshold, the flow rate of coolant that circulates in the first passage increases as compared to the flow rate of coolant that circulates in the first passage in the case where the required quantity of heat is zero (typically, minimum value). Thus, the required quantity of heat required by the heater core is sufficed by an increase in the flow rate of coolant that circulates in the first passage. Therefore, there is almost or completely no influence on the operation for utilizing heat recovered by the heater core (for example, heating, defrosting, deicing, or the like).

In the coolant control device according to another aspect of the invention, the third control means may keep the flow rate of the coolant that circulates in the first passage at a maximum value.

According to this aspect, during warm-up of the internal combustion engine and when the required quantity of heat required by the heater core exceeds the predetermined threshold, the flow rate of coolant that circulates in the first passage is kept at the maximum value. Thus, it is possible to minimize the flow rate of coolant that circulates in the second passage.

In the coolant control device according to another aspect of the invention, the third control means may increase the flow rate of the coolant that circulates in the second passage on the basis of the required quantity of heat as compared to the flow rate of the coolant that circulates in the second passage when the required quantity of heat is smaller than or equal to the predetermined threshold.

According to this aspect, during warm-up of the internal combustion engine and when the required quantity of heat required by the heater core exceeds the predetermined threshold, the flow rate of coolant that circulates in the second passage increases as compared to the flow rate of coolant that circulates in the second passage (that is, zero) in the case where the required quantity of heat is smaller than or equal to the predetermined threshold. Thus, the required quantity of heat required by the heater core is sufficed by an increase in the flow rate of coolant that circulates in the second passage in addition to coolant that circulates in the first passage. Therefore, there is almost or completely no influence on the operation for utilizing heat recovered by the heater core (for example, heating, defrosting, deicing, or the like).

In the coolant control device according to another aspect of the invention, the third control means may increase the flow rate of the coolant that circulates in the second passage on the basis of the required quantity of heat such that the flow rate of the coolant that circulates in the second passage does not exceed a predetermined upper limit value.

According to this aspect, the upper limit value is set to the flow rate of coolant that circulates in the second passage. Thus, the flow rate of coolant that circulates in the second passage is easily minimized.

The upper limit value of the flow rate of coolant is desirably set to an appropriate value in terms of the capability to appropriately suppress deterioration of fuel economy due to circulation of coolant in the second passage (for example, deterioration of fuel economy due to coolant that circulates in the second passage).

The operation and other advantages of the invention will further become apparent from an embodiment described below.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment in which the invention is applied to a cooling device 10 of a vehicle 1 will be described with reference to the accompanying drawings.

(1) Configuration of Vehicle

Figure 1:
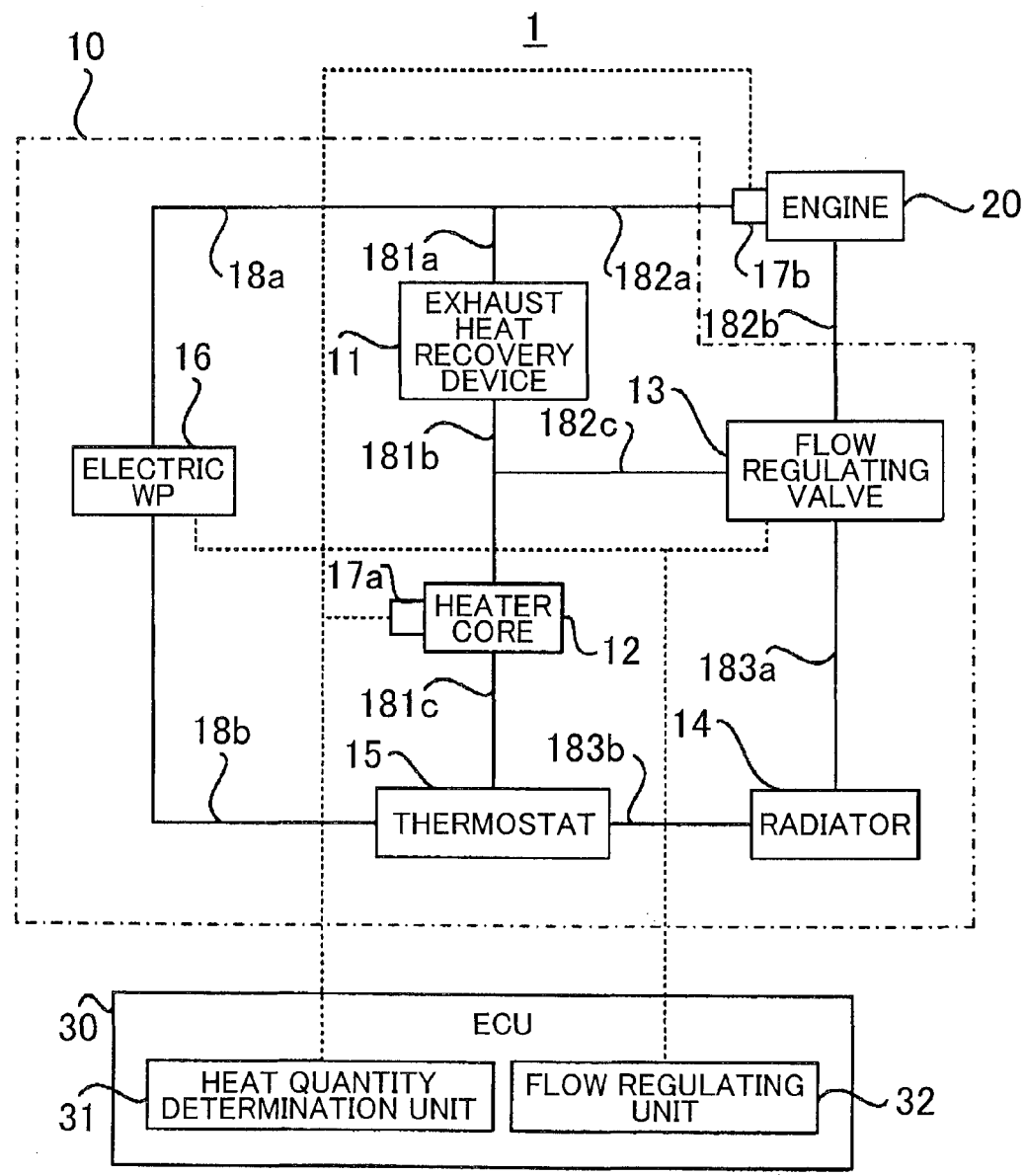
FIG. 1 is a block diagram that shows the configuration of a vehicle (particularly, a configuration relating to a cooling device) according to an embodiment.

First, the configuration of the vehicle 1 (particularly, the configuration relating to the cooling device 10) according to the present embodiment will be described with reference to FIG. 1. FIG. 1 is a block diagram that shows the configuration of the vehicle 1 (particularly, the configuration relating to the cooling device 10) according to the present embodiment.

As shown in FIG. 1, the vehicle 1 according to the present embodiment includes the cooling device 10, an engine 20 and an ECU 30.

The cooling device 10 includes an exhaust heat recovery device 11, a heater core 12, a flow regulating valve 13, a radiator 14, a thermostat 15, an electric water pump (WP) 16, a coolant temperature sensor 17a and a coolant temperature sensor 17b. The cooling device 10 includes a coolant passage 18. The coolant passage 18 is formed of a coolant passage 18a, a coolant passage 18b, a coolant passage 181a, a coolant passage 181b, a coolant passage 181c, a coolant passage 182a, a coolant passage 182b, a coolant passage 182c, a coolant passage 183a and a coolant passage 183b.

The electric WP 16 is a pump that discharges coolant at a desired flow rate. Coolant discharged from the electric WP 16 flows into the coolant passage 18a. The coolant passage 18a is branched into the coolant passage 181a and the coolant passage 182a.

The coolant passage 181a is connected to the exhaust heat recovery device 11. The coolant passage 181b that is connected to the heater core 12 extends from the exhaust heat recovery device 11. The coolant passage 181c that is connected to the thermostat 15 extends from the heater core 12. The coolant passage 18b that is connected to the electric WP 16 extends from the thermostat 15. That is, coolant discharged from the electric WP 16 passes through the coolant passage 18a, the coolant passage 181a, the coolant passage 181b, the coolant passage 181c and the coolant passage 18b sequentially, and returns to the electric WP 16. That is, a bypass passage that does not pass through the engine 20 (that is, the bypass passage that bypasses the engine 20) is formed of the coolant passage 18a, the coolant passage 181a, the coolant passage 181b, the coolant passage 181c and the coolant passage 18b. The bypass passage is one example of the above-described "first passage".

On the other hand, the coolant passage 182a is connected to the engine 20. The coolant passage 182b that is connected to the flow regulating valve 13 extends from the engine 20. The coolant passage 182c that is connected to the heater core 12 extends from the flow regulating valve 13. That is, coolant discharged from the electric WP 16 passes through the coolant passage 18a, the coolant passage 182a, the coolant passage 182b, the coolant passage 182c, the coolant passage 181c and the coolant passage 18b sequentially, and returns to the electric WP 16. That is, a main passage that passes through the engine 20 (that is, the main passage does not bypass the engine 20) and that does not pass through the radiator 14 (that is, the main passage bypasses the radiator 14) is formed of the coolant passage 18a, the coolant passage 182a, the coolant passage 182b, the coolant passage 182c, the coolant passage 181c and the coolant passage 18b. The main passage is one example of the above-described "second passage".

On the other hand, the coolant passage 183a that is connected to the radiator 14 extends from the flow regulating valve 13. The coolant passage 183b that is connected to the thermostat 15 extends from the radiator 14. That is, coolant discharged from the electric WP 16 passes through the coolant passage 18a, the coolant passage 182a, the coolant passage 182b, the coolant passage 183a, the coolant passage 183b and the coolant passage 18b sequentially, and returns to the electric WP 16. That is, a sub-passage that passes through the engine 20 (that is, the sub-passage that does not bypass the engine 20) and that also passes through the radiator 14 (that is, the sub-passage that does not bypass the radiator 14) is formed of the coolant passage 18a, the coolant passage 182a, the coolant passage 182b, the coolant passage 183a, the coolant passage 183b and the coolant passage 18b.

The engine 20 is a device that generates power by burning a mixture of supplied fuel and supplied air. For example, the engine 20 is a gasoline engine, a diesel engine, or the like. The engine 20 may be mounted on a hybrid vehicle, or the like. Coolant flows from the coolant passage 182a into the engine 20. Coolant flowing into the engine 20 passes through a water jacket in the engine 20, and then flows out through the coolant passage 182b. The water jacket is provided around a cylinder (not shown) in the engine 20. The cylinder exchanges heat with coolant that passes through the water jacket. As a result, the engine is cooled.

The temperature of coolant (hereinafter, referred to as "engine coolant temperature" where appropriate) that passes through the engine 20 is measured as needed by the coolant temperature sensor 17b installed at the engine 20 or installed near the engine 20. The engine coolant temperature measured by the coolant temperature sensor 17b is output to the ECU 30.

The exhaust heat recovery device 11 is provided in an exhaust passage (not shown) through which exhaust gas from the engine 20 passes. Coolant passes through the inside of the exhaust heat recovery device 11. The exhaust heat recovery device 11 recovers exhaust heat by exchanging heat between exhaust gas and coolant that passes through the inside thereof. That is, the exhaust heat recovery device 11 is able to heat coolant using the heat of exhaust gas.

The heater core 12 recovers heat of coolant that passes through the inside of the heater core 12 by exchanging heat between air and the coolant. Air warmed by the heat recovered by the heater core 12 is, for example, blown into a vehicle cabin by a blower called heater blower (not shown) for heating, defrosting, deicing, or the like.

The temperature of coolant that passes through the heater core 12 (hereinafter, referred to as "heater coolant temperature" where appropriate) is measured as needed by the coolant temperature sensor 17a installed at the heater core 12 or installed near the heater core 12. The heater coolant temperature measured by the coolant temperature sensor 17a is output to the ECU 30.

The flow regulating valve 13 is a valve (for example, flow control valve (FCV)) that is able to change an open/close state of a valve element under control of the ECU 30. For example, when the flow regulating valve 13 is closed, flow of coolant from the coolant passage 182b into the coolant passage 182c and flow of coolant from the coolant passage 182b into the coolant passage 183a are interrupted. In this case, coolant stagnates in the coolant passage 182a, the coolant passage 182b, the coolant passage 182c, the coolant passage 183a and the coolant passage 183b. On the other hand, when the flow regulating valve 13 is open, flow of coolant from the coolant passage 182b into the coolant passage 182c and flow of coolant from the coolant passage 182b into the coolant passage 183a are permitted. In this case, coolant, flowing out from the engine 20 to the coolant passage 182b passes through the coolant passage 182c and flows into the heater core 12, and passes through the coolant passage 183a and flows into the radiator 14. In addition, the flow regulating valve 13 is able to regulate the opening degree of the valve element while the flow regulating valve 13 is open under control of the ECU 30. That is, the flow regulating valve 13 is able to adjust the flow rate of coolant flowing out from the flow regulating valve 13 to the coolant passage 182c (substantially, the flow rate of coolant in the main passage) and the flow rate of coolant flowing out from the flow regulating valve 13 to the coolant passage 183a (substantially, the flow rate of coolant in the sub-passage).

In the radiator 14, coolant that passes through the inside of the radiator 14 is cooled by outside air. In this case, cooling of coolant inside the radiator 14 is facilitated by draft introduced by rotation of an electric fan (not shown).

The thermostat 15 includes a valve that opens or closes on the basis of the temperature of coolant. Typically, the valve of the thermostat 15 is opened when the temperature of coolant is high (for example, the temperature of coolant is higher than or equal to a predetermined temperature). In this case, the coolant passage 183b and the coolant passage 18b are connected to each other via the thermostat 15. As a result, coolant passes through the radiator 14. Thus, coolant is cooled, and overheating of the engine 20 is suppressed. In contrast to this, when the temperature of coolant is relatively low (for example, the temperature of coolant is not higher than or equal to the predetermined temperature), the valve of the thermostat 15 is closed. In this case, coolant does not pass through the radiator 14. Thus, a decrease in the temperature of coolant is suppressed, so overcooling of the engine 20 is suppressed.

The electric WP 16 is configured to include an electric motor, and circulates coolant in the coolant passage 18 by driving the motor. Specifically, the electric WP 16 is supplied with electric power from a battery, and the rotation speed, or the like, of the electric WP 16 is controlled by a control signal that is supplied from the ECU 30. Instead of the electric WP 16, a mechanical water pump that is operable irrespective of operation of the engine 20 and that is controllable by the ECU 30 may be used.

The electronic control unit (ECU) 30, for example, includes a central processing unit (CPU), a read only memory (ROM), a random access memory (RAM) (which are not shown), and the like. The ECU 30 is one example of the "coolant control device", and controls the cooling device 10 (particularly, controls the flow rate and path of coolant in the cooling device 10).

In order to control the cooling device 10 (particularly, control the flow rate and path of coolant in the cooling device 10), the ECU 30 includes a heat quantity determination unit 31 and a flow regulating unit 32. The flow regulating unit 32 is one example of the "first control means", "second control means" and "third control means". The detailed operations of the heat quantity determination unit 31 and flow regulating unit 32 will be described later (see FIG. 2).

(2) Flow of Control Over Cooling Device

Figure 2:
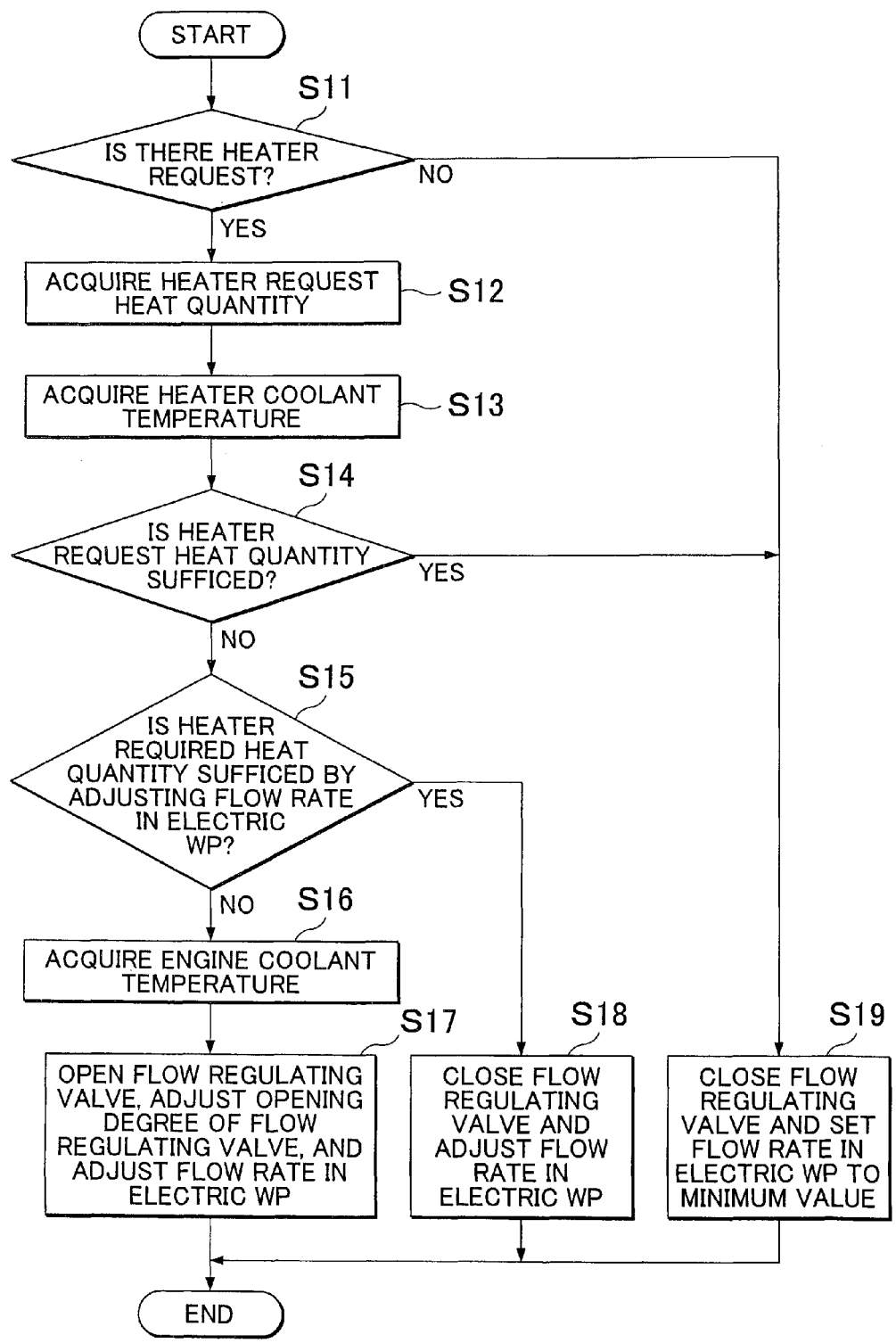
FIG. 2 is a flowchart that shows the flow of control over the cooling device, which is implemented by an ECU according to the embodiment.

Subsequently, the flow of control over the cooling device 10, which is implemented by the ECU 30 according to the present embodiment, will be described with reference to FIG. 2. FIG. 2 is a flowchart that shows the flow of control over the cooling device 10, which is implemented by the ECU 30 according to the present embodiment. Desirably, operations shown in FIG. 2 are mainly operations that are executed during warm-up of the engine 20 (that is, when the engine 20 in a cold state is warmed up).

As shown in FIG. 2, the heat quantity determination unit 31 determines whether there is a heater request (for example, a request for heating, defrosting, deicing, or the like, using heat recovered by the heater core 12) (step S11). For example, when an occupant of the vehicle 1 turns on a switch for heating, defrosting or deicing, the heat quantity determination unit 31 may determine that there is a heater request.

When it is determined that there is no heater request as a result of determination of step S11 (No in step S11), the flow regulating unit 32 controls the flow regulating valve 13 such that the flow regulating valve 13 is closed (step S19). As a result, coolant circulates in the bypass passage, and coolant stagnates in the main passage and the sub-passage. In addition, the flow regulating unit 32 controls the electric WP 16 such that the flow rate of coolant discharged from the electric WP 16 is set to a minimum value (step S19). As a result, the flow rate of coolant that circulates in the bypass passage is set to the minimum value.

Figure 3:
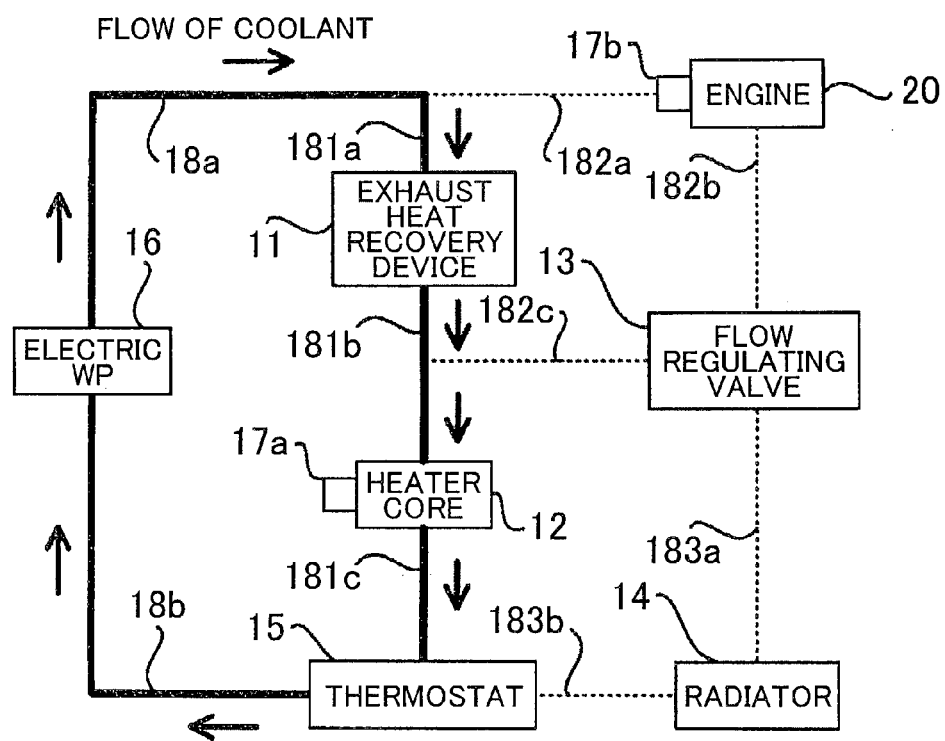
FIG. 3 is a block diagram that shows a mode of circulation of coolant when a flow regulating valve is closed.

Here, a mode of circulation of coolant when the flow regulating valve 13 is closed will be described with reference to FIG. 3. FIG. 3 is a block diagram that shows a mode of circulation of coolant when the flow regulating valve 13 is closed.

As shown in FIG. 3, when the flow regulating valve 13 is closed, flow of coolant from the coolant passage 182b into the coolant passage 182c and flow of coolant from the coolant passage 182b into the coolant passage 183a are interrupted. Therefore, coolant stagnates in the coolant passage 182a, the coolant passage 182b and the coolant passage 182c that constitute the main passage. Similarly, coolant stagnates in the coolant passage 183a and the coolant passage 183b that constitute the sub-passage. On the other hand, coolant circulates in the coolant passage 18a, the coolant passage 181a, the coolant passage 181b, the coolant passage 181c and the coolant passage 18b that constitute the bypass passage. The arrows in FIG. 3 indicate a direction in which coolant flows.

Referring back to FIG. 2, on the other hand, when it is determined that there is a heater request as a result of determination of step S11 (Yes in step S11), the heat quantity determination unit 31 acquires the quantity of heat required by the heater core 12 (hereinafter, referred to as "heater request heat quantity" where appropriate) (step S12). The heater request heat quantity means the quantity of heat required for heating, defrosting, deicing, or the like, by utilizing heat recovered by the heater core 12.

In addition, the heat quantity determination unit 31 acquires the heater coolant temperature (that is, the temperature of coolant that passes through the heater core 12) by referring to the result measured by the coolant temperature sensor 17a (step S13).

After that, the heat quantity determination unit 31 determines whether the heater request heat quantity is sufficed by heat recoverable by the heater core 12 (in other words, heat of the coolant that passes through the heater core 12) (step S14). Particularly, the heat quantity determination unit 31 desirably determines whether the heater request heat quantity is sufficed by heat recoverable by the heater core 12 in a state where the flow rate of coolant that passes through the heater core 12 is a minimum value and the flow regulating valve 13 is closed (that is, coolant circulates in the bypass passage, and coolant stagnates in the main passage and the sub-passage). The quantity of heat recoverable by the heater core 12 is determined on the basis of the heater coolant temperature and the flow rate of coolant that passes through the heater core 12. When the quantity of heat recoverable by the heater core 12 (particularly, the quantity of heat recoverable by the heater core 12 in a state where the flow rate of coolant that passes through the heater core 12 is the minimum value) is larger than or equal to the heater request heat quantity, the heat quantity determination unit 31 may determine that the heater request heat quantity is sufficed by heat recoverable by the heater core 12. On the other hand, when the quantity of heat recoverable by the heater core 12 is not larger than or equal to the heater request heat quantity, the heat quantity determination unit 31 may determine that the heater request heat quantity is not sufficed by heat recoverable by the heater core 12.

Determination as to whether the heater request heat quantity is sufficed by heat recoverable by the heater core 12 in a state where the flow regulating valve 13 is closed substantially corresponds to determination as to whether the heater request heat quantity is sufficed by heat recovered by the exhaust heat recovery device 11.

When it is determined that the heater request heat quantity is sufficed by heat recoverable by the heater core 12 as a result of determination of step S14 (Yes in step S14), the flow regulating unit 32 controls the flow regulating valve 13 such that the flow regulating valve 13 is closed (step S19). As a result, coolant circulates in the bypass passage, and coolant stagnates in the main passage and the sub-passage. In addition, the flow regulating unit 32 controls the electric WP 16 such that the flow rate of coolant that is discharged from the electric WP 16 is set to the minimum value (step S19). As a result, the flow rate of coolant that circulates in the bypass passage is set to the minimum value.

Even when such control is executed, the heater request heat quantity is sufficed by heat recoverable by the heater core 12 in a state where the flow rate of coolant that passes through the heater core 12 is the minimum value and the flow regulating valve 13 is closed, so an operation (such as heating, defrosting and deicing) based on a heater request is appropriately performed.

On the other hand, when it is determined that the heater request heat quantity is not sufficed by the heat recoverable by the heater core 12 as a result of determination of step S14 (No in step S14), an operation for sufficing the heater request heat quantity is performed. In the present embodiment, any one of (i) an operation for increasing the flow rate of coolant that passes through the exhaust heat recovery device 11 (that is, coolant that circulates in the bypass passage) while the flow regulating valve 13 remains closed and (ii) an operation for causing coolant to pass through not only the exhaust heat recovery device 11 but also the engine 20 (that is, an operation for circulating coolant in the main passage as well by opening the flow regulating valve 13) is selectively performed as the operation for sufficing the heater request heat quantity. In order to select any one of these two operations to be performed, the heat quantity determination unit 31 initially determines whether the heater request heat quantity is sufficed by heat recoverable by the heater core 12 in a state where the flow rate of coolant that passes through the heater core 12 is increased from the minimum value (furthermore, in a state where the flow regulating valve 13 is closed) (step S15). This is because, if the flow rate of coolant that passes through the heater core 12 increases, the quantity of heat recoverable by the heater core 12 also increases.

However, the heat quantity determination unit 31 desirably determines whether the heater request heat quantity is sufficed while deterioration of fuel economy is reduced as much as possible (in other words, deterioration of fuel economy is minimized) at the time of determination of step S15. For example, the heat quantity determination unit 31 desirably selects one of the above-described two operations, which reduces deterioration of fuel economy as much as possible (desirably, minimizes deterioration of fuel economy or does not deteriorate fuel economy).

Figure 4A:
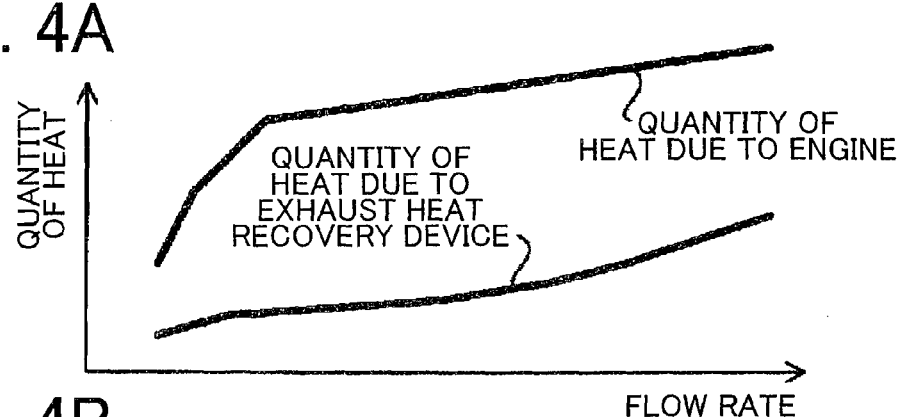
FIG. 4A is a graph that shows the correlation between a flow rate of coolant and each of a quantity of heat recoverable from coolant that passes through an exhaust heat recovery device (that is, coolant that circulates in a bypass passage) and a quantity of heat recoverable from coolant that passes through an engine (that is, coolant that circulates in a main passage)
Figure 4B:
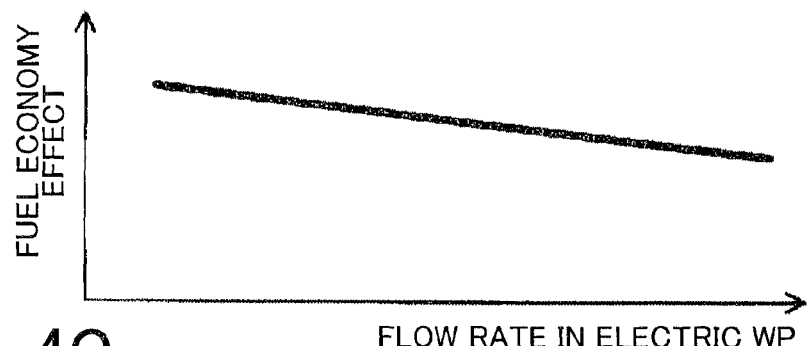
FIG. 4B is a graph that shows the correlation between a flow rate of coolant that passes through the exhaust heat recovery device and a fuel economy effect.
Figure 4C:
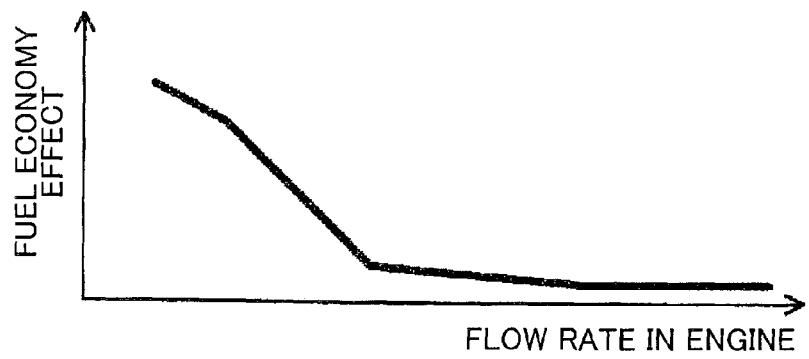
FIG. 4C is a graph that shows the correlation between a flow rate of coolant that passes through the engine and a fuel economy effect.

Here, the correlation between each of the above-described two operations and deterioration of fuel economy will be described with reference to FIG. 4A to FIG. 4C. FIG. 4A to FIG. 4C are graphs that respectively show the correlation between a flow rate of coolant and each of a quantity of heat recoverable from coolant that passes through the exhaust heat recovery device 11 (that is, coolant that circulates in the bypass passage) and a quantity of heat recoverable from coolant that passes through the engine 20 (that is, coolant that circulates in the main passage), the correlation between a flow rate of coolant that passes through the exhaust heat recovery device 11 and deterioration of fuel economy and the correlation between a flow rate of coolant that passes through the engine 20 and deterioration of fuel economy.

As shown in FIG. 4A, when the flow rate of coolant that passes through the exhaust heat recovery device 11 increases, the quantity of heat recoverable from coolant that passes through the exhaust heat recovery device 11 also increases. Similarly, when the flow rate of coolant that passes through the engine 20 increases, the quantity of heat recoverable from coolant that passes through the engine 20 also increases. However, under the condition that the flow rate of coolant that passes through the exhaust heat recovery device 11 and the flow rate of coolant that passes through the engine 20 are the same, the quantity of heat recoverable from coolant that passes through the exhaust heat recovery device 11 is smaller than the quantity of heat recoverable from coolant that passes through the engine 20. Thus, the heat quantity determination unit 31 is able to relatively easily recognize that the quantity of heat recoverable by the heater core 12 by setting the flow rate of coolant that passes through the exhaust heat recovery device 11 and the flow rate of coolant that passes through the engine 20 as needed.

Incidentally, an increase in the flow rate of coolant that passes through the exhaust heat recovery device 11 is typically achieved by an increase in the flow rate of coolant that is discharged from the electric WP 16. With an increase in the flow rate of coolant that is discharged from the electric WP 16, the amount of electric power consumed by the electric WP 16 increases. An increase in the amount of electric power consumed by the electric WP 16 leads to deterioration in the fuel economy of the vehicle 1. That is, as shown in FIG. 4B, as the flow rate of coolant that is discharged from the electric WP 16 increases, the fuel economy of the vehicle 1 deteriorates.

On the other hand, passage of coolant also through the engine 20 hinders warm-up of the engine 20. In other words, with an increase in the flow rate of coolant that passes through the engine 20, warm-up of the engine 20 is hindered. Hindrance of warm-up of the engine 20 leads to deterioration in the fuel economy of the vehicle 1. That is, as shown in FIG. 4C, as the flow rate of coolant that passes through the engine 20 increases, the fuel economy of the vehicle 1 deteriorates.

Thus, the heat quantity determination unit 31 desirably selects one of the above-described two operations, which reduces deterioration of fuel economy as much as possible (desirably, minimizes deterioration of fuel economy or does not deteriorate fuel economy) as a whole in consideration of both deterioration of fuel economy due to adjustment of coolant that is discharged from the electric WP 16 and deterioration of fuel economy due to an increase in the flow rate of coolant that passes through the engine 20. At the time of executing such an operation, the heat quantity determination unit 31 may refer to the graphs shown in FIG. 4A to FIG. 4C (or other various pieces of information, such as a function, a mapping, a mathematical expression and a table).

Specifically, when the heater request heat quantity is not sufficed unless an operation for causing coolant to pass through not only the exhaust heat recovery device 11 but also the engine 20, the necessity to take deterioration of fuel economy into consideration is small. Thus, deterioration of fuel economy is taken into consideration typically when the heater request heat quantity is sufficed by any one of (i) the operation for increasing the flow rate of coolant that passes through the exhaust heat recovery device 11 while the flow regulating valve 13 remains closed and (ii) the operation for causing coolant to pass through not only the exhaust heat recovery device 11 but also the engine 20. In this case, from the graph shown in FIG. 4A, the flow rate of coolant that passes through the exhaust heat recovery device 11 (that is, the flow rate that can suffice the heater request heat quantity) in the case of performing the operation for increasing the flow rate of coolant that passes through the exhaust heat recovery device 11 while the flow regulating valve 13 remains closed is derived. As a result, from the graph shown in FIG. 4B, the degree of deterioration of fuel economy due to the operation for increasing the flow rate of coolant that passes through the exhaust heat recovery device 11 while the flow regulating valve 13 remains closed is derived. Similarly, from the graph shown in FIG. 4A, the flow rate of coolant that passes through the exhaust heat recovery device 11 and the flow rate of coolant that passes through the engine 20 (that is, the flow rate that can suffice the heater request heat quantity) in the case of performing the operation for causing coolant to pass through not only the exhaust heat recovery device 11 but also the engine 20 is derived. As a result, from the graphs shown in FIG. 4B and FIG. 4C, the degree of deterioration of fuel economy due to the operation for causing coolant to pass through not only the exhaust heat recovery device 11 but also the engine 20 is derived. The heat quantity determination unit 31 is able to select the operation for reducing deterioration of fuel economy as much as possible (desirably, minimizing deterioration of fuel economy or does not deteriorate fuel economy) by comparing both the degrees of deterioration of fuel economy with each other.

Referring back to FIG. 2, when it is determined that the heater request heat quantity is sufficed by heat recoverable by the heater core 12 in a state where the flow rate of coolant that passes through the heater core 12 is increased as a result of determination of step S15 (Yes in step S15), the flow regulating unit 32 controls the flow regulating valve 13 such that the flow regulating valve 13 is closed (step S18). However, in order for the operation of step S18 to be executed, it is desirably determined that deterioration of fuel economy due to the operation for increasing the flow rate of coolant that passes through the exhaust heat recovery device 11 while the flow regulating valve 13 remains closed is smaller than deterioration of fuel economy due to the operation for opening the flow regulating valve 13. As a result, coolant circulates in the bypass passage, and coolant stagnates in the main passage and the sub-passage.

In addition; the flow regulating unit 32 controls the electric WP 16 such that the flow rate of coolant that is discharged from the electric WP 16 is increased with respect to the minimum value (in other words, the flow rate of coolant that is discharged from the electric WP 16 is adjusted) (step S18). At this time, the flow regulating unit 32 desirably increases the flow rate of coolant such that the heater request heat quantity is sufficed by heat recoverable by the heater core 12. Thus, the flow regulating unit 32 desirably determines the flow rate of coolant that is discharged from the electric WP 16 on the basis of the heater request heat quantity acquired in step S12 and the heater coolant temperature acquired in step S13.

When the operation of step S18 is executed, the flow regulating valve 13 is closed. Thus, the flow rate of coolant that is discharged from the electric WP 16 is substantially the same as the flow rate of coolant that circulates in the bypass passage. Thus, the flow regulating unit 32 determines the flow rate of coolant that circulates in the bypass passage on the basis of the heater request heat quantity.

Figure 5:
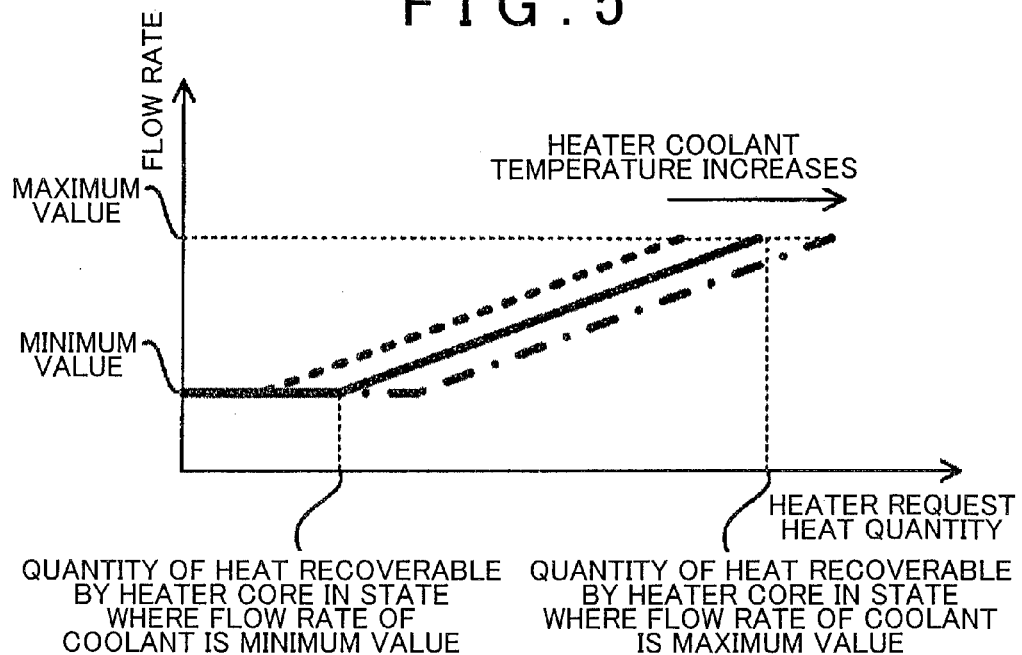
FIG. 5 is a graph that shows the correlation between a heater request heat quantity and a flow rate of coolant at which an electric WP should discharge (in other words, a flow rate of coolant that should circulate in the bypass passage) in order to suffice the heat request heat quantity.

Here, one example of an operation for determining the flow rate of coolant that is discharged from the electric WP 16 (in other words, the flow rate of coolant that circulates in the bypass passage) on the basis of the heater request heat quantity will be described with reference to FIG. 5. FIG. 5 is a graph that shows the correlation between a heater request heat quantity and a flow rate of coolant that should be discharged from the electric WP 16 in order to suffice the heater request heat quantity (in other words, a flow rate of coolant that should circulate in the bypass passage).

As shown in FIG. 5, when the heater request heat quantity is relatively small (for example, the heater request heat quantity is smaller than or equal to the quantity of heat recoverable by the heater core 12 in a state where the flow rate of coolant that passes through the heater core 12 is the minimum value), the flow rate of coolant that is discharged from the electric WP 16 may be the minimum value as described above.

On the other hand, when the heater request heat quantity is relatively large (for example, the heater request heat quantity exceeds the quantity of heat recoverable by the heater core 12 in a state where the flow rate of coolant that passes through the heater core 12 is the minimum value), the flow rate of coolant that is discharged from the electric WP 16 also increases with an increase in the heater request heat quantity. Thus, the flow regulating unit 32 desirably determines the flow rate of coolant that is discharged from the electric WP 16 on the basis of the heater request heat quantity by referring to the graph shown in FIG. 5 (or other various pieces of information, such as a function, a mapping, a mathematical expression and a table).

However, in terms of the specifications of the electric WP 16, the specifications of the cooling device 10, and the like, the flow rate of coolant that is discharged from the electric WP 16 (in other words, the flow rate of coolant that circulates in the bypass passage) has a maximum value. That is, when the flow regulating valve 13 is closed, the heater request heat quantity that exceeds the quantity of heat recoverable by the heater core 12 in a state where the flow rate of coolant that passes through the heater core 12 is the maximum value cannot be sufficed. Thus, in this case, sufficiency of the heater request heat quantity is attempted by using not only heat of coolant that flows into the heater core 12 via the exhaust heat recovery device 11 but also heat of coolant that flows into the heater core 12 via the engine 20 (see FIG. 6).

As shown in FIG. 5, as the heater coolant temperature varies, the correlation between a heater request heat quantity and a flow rate of coolant also varies. For example, as the heater coolant temperature increases, the quantity of heat recoverable from coolant at the same flow rate increases. That is, as the heater coolant temperature increases, the flow rate of coolant required to suffice the same heater request heat quantity reduces. As a result, as the heater coolant temperature increases, the correlation between a heater request heat quantity and a flow rate of coolant shifts relatively rightward as indicated by the alternate long and short dash line in FIG. 5. On the other hand, for example, as the heater coolant temperature reduces, the quantity of heat recoverable from coolant at the same flow rate reduces. That is, as the heater coolant temperature decreases, the flow rate of coolant required to suffice the same heater request heat quantity increases. As a result, as the heater coolant temperature decreases, the correlation between a heater request heat quantity and a flow rate of coolant shifts relatively leftward as indicated by the dashed line in FIG. 5.

Referring back to FIG. 2, on the other hand, when it is determined that the heater request heat quantity is not sufficed by heat recoverable by the heater core 12 in a state where the flow rate of coolant that passes through the heater core 12 is increased from the minimum value (No in step S15), sufficiency of the heater request heat quantity is attempted by using not only heat of coolant that flows into the heater core 12 via the exhaust heat recovery device 11 but also heat of coolant that flows into the heater core 12 via the engine 20. Alternatively, even when it is determined that the heater request heat quantity is sufficed by heat recoverable from the heater core 12 in a state where the flow rate of coolant that passes through the heater core 12 is increased from the minimum value as a result of determination of step S15, but when it is determined that deterioration of fuel economy due to the operation for increasing the flow rate of coolant that passes through the exhaust heat recovery device 11 while the flow regulating valve 13 remains closed is larger than deterioration of fuel economy due to the operation for opening the flow regulating valve 13, sufficiency of the heater request heat quantity is attempted by using not only heat of coolant that flows into the heater core 12 via the exhaust heat recovery device 11 but also heat of coolant that flows into the heater core 12 via the engine 20. Therefore, initially, the heat quantity determination unit 31 acquires the engine coolant temperature (that is, the temperature of coolant that passes through the engine 20) by referring to the result measured by the coolant temperature sensor 17*b* (step S16).

After that, the flow regulating unit 32 controls the flow regulating valve 13 such that the flow regulating valve 13 is opened (step S17). As a result, coolant circulates in the bypass passage, and coolant circulates in the main passage.

Figure 6:
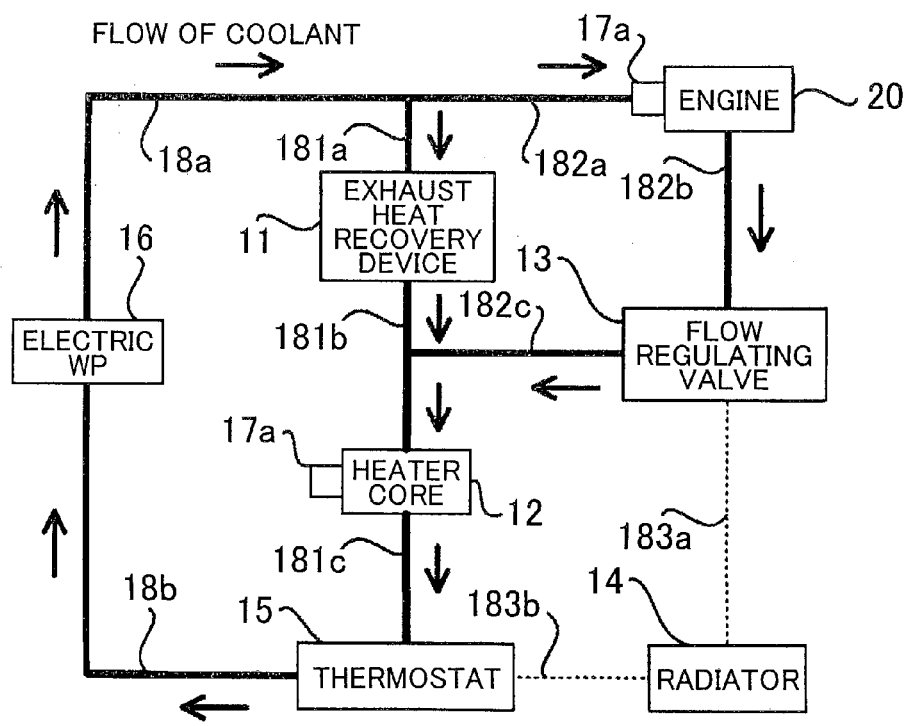
FIG. 6 is a block diagram that shows a mode of circulation of coolant when the flow regulating valve is open.

Here, a mode of circulation of coolant in the case where the flow regulating valve 13 is open will be described with reference to FIG. 6. FIG. 6 is a block diagram that shows a mode of circulation of coolant in the case where the flow regulating valve 13 is open.

As shown in FIG. 6, when the flow regulating valve 13 is open, flow of coolant from the coolant passage 182*b* into the coolant passage 182*c* and flow of coolant from the coolant passage 182*b* into the coolant passage 183*a* are permitted. Therefore, coolant circulates in the coolant passage 182*a*, the coolant passage 182*b* and the coolant passage 182*c* that constitute the main passage. In addition, when the thermostat 15 is open, coolant also circulates in the coolant passage 183*a* and the coolant passage 183*b* that constitute the sub-passage. However, FIG. 5 shows a state where the thermostat 15 is closed (that is, a state where coolant stagnates in the coolant passage 183*a* and the coolant passage 183*b* that constitute the sub-passage). In addition, coolant also circulates in the coolant passage 18*a*, the coolant passage 181*a*, the coolant passage 181*b*, the coolant passage 181*c* and the coolant passage 18*b* that constitute the bypass passage. The arrows in FIG. 6 indicate a direction in which coolant flows.

Referring back to FIG. 2, additionally, the flow regulating unit 32 controls the flow regulating valve 13 such that the opening degree of the valve element of the flow regulating valve 13 is adjusted (step S17). That is, the flow regulating unit 32 adjusts the flow rate of coolant that circulates in the main passage (in other words, the flow rate of coolant that passes through the engine 20) by adjusting the opening degree of the valve element of the flow regulating valve 13. In addition, the flow regulating unit 32 controls the electric WP 16 such that the flow rate of coolant that is discharged from the electric WP 16 is adjusted (step S17). That is, the flow regulating unit 32 adjusts the flow rate of coolant that circulates in the bypass passage (in other words, the flow rate of coolant that passes through the exhaust heat recovery device 11) and the flow rate of coolant that circulates in the main passage (in other words, the flow rate of coolant that passes through the engine 20) by adjusting the flow rate of coolant that is discharged from the electric WP 16.

At this time, the flow regulating unit 32 adjusts the opening degree of the valve element of the flow regulating valve 13 and the flow rate of coolant that is discharged from the electric WP 16 such that the flow rate of coolant that passes through the coolant passage 181*a*, the coolant passage 182*a* and the coolant passage 182*c* that constitute the bypass passage (that is, substantially, the flow rate of coolant that passes through the exhaust heat recovery device 11) is not decreased. Particularly, the flow regulating unit 32 desirably adjusts the opening degree of the valve element of the flow regulating valve 13 and the flow rate of coolant that is discharged from the electric WP 16 such that the flow rate of coolant that passes through the coolant passage 181*a*, the coolant passage 182*a* and the coolant passage 182*c* that constitute the bypass passage (that is, substantially, the flow rate of coolant that passes through the exhaust heat recovery device 11) is kept at the maximum value.

Furthermore, the flow regulating unit 32 adjusts the opening degree of the valve element of the flow regulating valve 13 and the flow rate of coolant that is discharged from the electric WP 16 such that the heater request heat quantity is sufficed by heat recoverable by the heater core 12 (that is, heat of coolant that flows into the heater core 12 via the exhaust heat recovery device 11 and heat of coolant that flows into the heater core 12 via the engine 20). Thus, the flow regulating unit 32 desirably determines the opening degree of the valve element of the flow regulating valve 13 and the flow rate of coolant that is discharged from the electric WP 16 on the basis of the heater request heat quantity acquired in step S12, the heater coolant temperature acquired in step S13 and the engine coolant temperature acquired in step S16.

In the present embodiment, as described above, the flow rate of coolant that passes through the exhaust heat recovery device 11 is kept at the maximum value. That is, the quantity of heat recoverable by the heater core 12 from coolant that flows into the heater core 12 via the exhaust heat recovery device 11 is kept at the maximum value. Therefore, the quantity of heat that should be recovered by the heater core 12 from coolant that flows into the heater core 12 via the engine 20 in order to suffice the heater request heat quantity is minimized. That is, the flow rate of coolant that passes through the engine 20 is minimized. In terms of the above point, the flow regulating unit 32 adjusts the opening degree of the valve element of the flow regulating valve 13 and the flow rate of coolant that is discharged from the electric WP 16.

However, the flow rate of coolant that flows into the heater core 12 via the engine 20 desirably does not exceed a predetermined upper limit value that is set in terms of reducing deterioration of fuel economy due to an increase in the flow rate of coolant that passes through the engine 20 as much as possible.

As described above, an increase in the flow rate of coolant that is discharged from the electric WP 16 leads to deterioration in the fuel economy of the vehicle 1. On the other hand, an increase in the flow rate of coolant that circulates in the main passage (that is, coolant that passes through the engine 20) also leads to deterioration in the fuel economy of the vehicle 1. Thus, the flow regulating unit 32 may adjust the opening degree of the valve element of the flow regulating valve 13 and the flow rate of coolant that is discharged from the electric WP 16 such that deterioration of fuel economy as a whole in consideration of both deterioration of fuel economy due to adjustment of the flow rate of coolant that is discharged from the electric WP 16 and deterioration of fuel economy due to an increase in the flow rate of coolant that circulates in the main passage (that is, coolant that passes through the engine 20) is reduced as much as possible (desirably, deterioration of fuel economy as a whole is minimized).

As described above, according to the present embodiment, when there is no heater request, the flow regulating valve 13 is closed. As a result, coolant circulates in the bypass passage, and coolant stagnates in the main passage and the sub-passage. Therefore, in comparison with a mode in which coolant circulates in at least one of the main passage and the sub-passage (that is, coolant passes through the water jacket of the engine 20), heating of coolant that stagnates in the water jacket of the engine 20 is facilitated (in other words, cooling of coolant is suppressed). As a result, warm-up of the engine 20 is facilitated. Thus, deterioration of fuel economy due to passage of coolant through the engine 20 is appropriately suppressed.

In addition, when the heater request heat quantity is sufficed in a state where there is a heater request and the flow rate of coolant is the minimum value as well, the flow regulating valve 13 is closed. As a result, coolant circulates in the bypass passage, and coolant stagnates in the main passage and the sub-passage. Thus, deterioration of fuel economy due to passage of coolant through the engine 20 is appropriately suppressed. In addition, in this case as well, the heater request heat quantity is sufficed, so the operation based on a heater request (for example, heating, defrosting, deicing, or the like) is appropriately performed.

In addition, when there is a heater request and the heater request heat quantity is sufficed by an increase in the flow rate of coolant that is discharged from the electric WP 16 (that is, an increase from the minimum value) as well, the flow regulating valve 13 is closed. As a result, coolant circulates in the bypass passage, and coolant stagnates in the main passage and the sub-passage. Thus, deterioration of fuel economy due to passage of coolant through the engine 20 is appropriately suppressed. In addition, in this case as well, the heater request heat quantity is sufficed, so the operation based on a heater request (for example, heating, defrosting, deicing, or the like) is appropriately performed.

On the other hand, the flow regulating valve 13 is opened (that is, coolant flows into the engine 20) only when there is a heater request and the heater request heat quantity is not sufficed by an increase in the flow rate of coolant that is discharged from the electric WP 16 (that is, an increase from the minimum value). In this case as well, the flow rate of coolant that passes through the exhaust heat recovery device 11 does not decrease (typically, the flow rate of coolant is kept at the maximum value). That is, the quantity of heat recoverable by the heater core 12 from coolant that flows into the heater core 12 via the exhaust heat recovery device 11 does not reduce (typically, the quantity of heat is kept at the maximum value). Therefore, the quantity of heat that should be recovered by the heater core 12 from coolant that flows into the heater core 12 via the engine 20 in order to suffice the heater request heat quantity is minimized. That is, even when the flow regulating valve 13 is opened, the flow rate of coolant that passes through the engine 20 is minimized. Thus, even when the flow regulating valve 13 is opened, it is possible to minimize deterioration of fuel economy due to opening of the flow regulating valve 13 (that is, flow of coolant into the engine 20).

In this way, in the present embodiment, during warm-up of the engine 20, even when there is a heater request, the flow regulating valve 13 is basically closed. However, in the present embodiment, when the heater request heat quantity is not sufficed while the flow regulating valve 13 remains closed, the flow regulating valve 13 is opened in a limited way while the flew rate of coolant in the bypass passage that does not pass through the engine 20 is kept. As a result, in the present embodiment, it is possible to suppress circulation of coolant to the main passage that passes through the engine 20 as much as possible, and it is possible to suppress the flow rate of coolant in the main passage as much as possible even in a situation that coolant must be circulated to the main passage that passes through the engine 20. In other words, in the present embodiment, in order to suppress deterioration of fuel economy as much as possible as a main object, it is possible to suppress circulation of coolant to the main passage that passes through the engine 20 as much as possible, and it is possible to suppress the flow rate of coolant in the main passage as much as possible even in a situation that coolant must be circulated to the main passage that passes through the engine 20. Thus, deterioration of fuel economy is appropriately suppressed.

The invention is not limited to the above-described embodiment. The invention may be modified as needed within the scope of the appended claims without departing from the scope and idea of the invention, which can be understood from the specification. The technical scope of the invention also encompasses the thus modified coolant control device.

The invention claimed is:

1. A coolant control device that controls a cooling device including a first passage for circulating coolant between an exhaust heat recovery device and a heater core while bypassing an internal combustion engine and a second passage for circulating the coolant between the internal combustion engine and the heater core, comprising:
    a first control unit that, during warm-up of the internal combustion engine, (i) circulates the coolant to the first passage and (ii) stops circulation of the coolant in the second passage;
    a second control unit that, during warm-up of the internal combustion engine and when a required quantity of heat required by the heater core is smaller than or equal to a predetermined threshold, (i) adjusts a flow rate of the coolant that circulates in the first passage on the basis of the required quantity of heat and then circulates the coolant in the first passage and (ii) stops circulation of the coolant in the second passage, wherein said required quantity of heat is a quantity of heat required for at least one operation utilizing heat recovered by the heater core; and
    a third control unit that, during warm-up of the internal combustion engine and when the required quantity of heat exceeds the predetermined threshold, (i) circulates the coolant in the first passage without reducing the flow rate of the coolant that passes through the first passage as compared to the flow rate of the coolant that circulates in the first passage when the required quantity of heat is smaller than or equal to the predetermined threshold and (ii) adjusts a flow rate of the coolant that circulates in the second passage on the basis of the required quantity of heat and an engine coolant temperature, and then circulates the coolant in the second passage.

2. The coolant control device according to claim 1, wherein the second control means unit increases the flow rate of the coolant that circulates in the first passage on the basis of the required quantity of heat as compared to the flow rate of the coolant that circulates in the first passage when the required quantity of heat is zero.

3. The coolant control device according to claim 1, wherein the third control unit keeps the flow rate of the coolant that circulates in the first passage at a maximum value.

4. The coolant control device according to claim 1, wherein during warm-up of the internal combustion engine and when the required quantity of heat exceeds the predetermined threshold, the third control means unit (i) circulates the coolant in the first passage without reducing the flow rate of the coolant that passes through the first passage as compared to the flow rate of the coolant that circulates in the first passage when the required quantity of heat is smaller than or equal to the predetermined threshold and (ii) increases the flow rate of the coolant that circulates in the second passage on the basis of the required quantity of heat as compared to the flow rate of the coolant that circulates in the second passage when the required quantity of heat is smaller than or equal to the predetermined threshold.

5. The coolant control device according to claim 1, wherein the third control unit increases the flow rate of the coolant that circulates in the second passage on the basis of the required quantity of heat such that the flow rate of the coolant that circulates in the second passage does not exceed a predetermined upper limit value.

\* \* \* \* \*